(12) United States Patent
Sato et al.

(10) Patent No.: US 6,713,203 B2
(45) Date of Patent: Mar. 30, 2004

(54) FUEL CELL

(75) Inventors: Shuji Sato, Kawagoe (JP); Koji Okazaki, Shiki (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 139 days.

(21) Appl. No.: 09/997,742

(22) Filed: Nov. 29, 2001

(65) Prior Publication Data

US 2002/0076592 A1 Jun. 20, 2002

(30) Foreign Application Priority Data

Nov. 29, 2000 (JP) ........................................ 2000-363261

(51) Int. Cl.[7] .............................................. H01M 8/04
(52) U.S. Cl. .............................. 429/26; 429/34; 429/39
(58) Field of Search .............................. 429/26, 34, 38, 429/39

(56) References Cited

U.S. PATENT DOCUMENTS

| | | | | |
|---|---|---|---|---|
| 5,922,485 | A | * 7/1999 | Enami | .................... 429/26 |
| 6,306,533 | B1 | * 10/2001 | Mund et al. | .................... 429/26 |
| 2002/0127453 | A1 | * 9/2002 | Kitagawa et al. | ......... 429/38 X |

FOREIGN PATENT DOCUMENTS

| | | | | |
|---|---|---|---|---|
| JP | 58-166662 | * 10/1983 | ............ H01M/8/02 |
| JP | 61-131370 A | 6/1986 | ............ H01M/8/02 |
| JP | 11-233128 | * 8/1999 | ............ H01M/8/02 |
| JP | 2000-090943 | 3/2000 | ............ H01M/8/02 |

* cited by examiner

Primary Examiner—Stephen Kalafut
(74) Attorney, Agent, or Firm—Lahive & Cockfield, LLP; Anthony A. Laurentano (57) ABSTRACT

A tube having a passage for passage of a temperature-regulating medium therethrough has a surface covered with an elastic insulating layer which is coated with an insulating lubricant. The tube is inserted in a through hole which is defined in a fuel cell stack in the direction in which generator cells are stacked.

10 Claims, 5 Drawing Sheets

FUEL CELL

BACKGROUND OF THE INVENTION

1. Field of the Invention

The present invention relates to a fuel cell, and more particularly to a fuel cell which is capable of efficiently controlling the temperature of a fuel cell stack.

2. Description of the Related Art

Phosphoric acid fuel cells have a plurality of generator cells each comprising an electrolyte electrode assembly having an electrolyte of a matrix made of a basic polymer such as polybenzimidazole or a porous silicon carbide and impregnated with a concentrated phosphoric acid, the electrolyte being interposed between an anode electrode and a cathode electrode, and a pair of separators sandwiching the electrolyte electrode assembly therebetween. A certain number of such generator cells are stacked and electrically connected in series, making up a fuel cell stack which is stored in a container. The fuel cell stack stored in the container serves as a phosphoric acid fuel cell.

A generator cell for solid polymer fuel cells employs an electrolyte comprising a polymer ion exchange film (positive ion exchange film) made of polytetrafluoroethylene sulfonic acid or the like and impregnated with water. A certain number of such generator cells are also stacked and electrically connected in series, making up a fuel cell stack which is stored in a container. The fuel cell stack stored in the container serves as a solid polymer fuel cell.

Each of the anode and cathode electrodes has a gas diffusion layer made of a carbon cloth or the like and an electrode catalyst layer made of porous carbon particles carrying platinum on their surfaces and uniformly disposed on the surface of the gas diffusion layer. The anode and cathode electrodes are joined to the electrolyte such that their electrode catalyst layers confront each other through the electrolyte. The anode and cathode electrodes of the type described above can be used in various kinds of fuel cells in addition to the phosphoric acid fuel cells and the solid polymer fuel cells.

For operating the fuel cells thus constructed, a fuel gas such as a gas chiefly containing hydrogen (hereinafter referred to as "hydrogen-containing gas") is supplied to the anode electrode, whereas an oxidizing gas (hereinafter referred to as "oxygen-containing gas") is supplied to the cathode electrode. The hydrogen in the hydrogen-containing gas is ionized as represented by the following formula (A), generating hydrogen ions and electrons:

$$2H_2 \rightarrow 4H^+ + 4e \qquad (A)$$

The generated hydrogen ions move through the electrolyte to the cathode electrode. During this time, the electrons flow to an external circuit that is electrically connected to the anode electrode and the cathode electrode, are used as an electric energy in the form of a direct current to energize the external circuit, and then flow to the cathode electrode.

The hydrogen ions that have moved to the cathode electrode and the electrons that have moved to the cathode electrode via the external circuit react with the oxygen contained in the oxygen-containing gas supplied to the cathode electrode, as indicated by the following formula (B):

$$O_2 + 4H^+ + 4e \rightarrow 2H_2O \qquad (B)$$

In order to enable the fuel cell to exhibit an excellent cell performance, the efficiency of the reactions represented by the above formulas (A), (B) needs to be high during the operation of the fuel cell. The fuel cell incorporates a cooling mechanism for setting the temperature of the fuel cell stack to make the above reactions most efficient. For example, such a cooling mechanism comprises coolant passages defined in the separators for cooling the generator cells with a coolant such as water or the like which is supplied to the coolant passages.

However, the above cooling mechanism is disadvantageous in that a temperature distribution tends to occur within the end faces of the generator cells. To avoid this drawback, there has been proposed a through cooling arrangement for cooling the generator cells with a coolant that flows through coolant passages which are defined through the generator cells in the direction of the stack of the generator cells, as disclosed in Japanese laid-open patent publications Nos. 61-131370 and 2000-90943.

The coolant passages are usually made up of an electric insulator, as disclosed in Japanese laid-open patent publication No. 2000-90943, because if the coolant passages were made up of an electric conductor, the anode and cathode electrodes would be short-circuited to each other.

The material of the coolant passages is also required to be corrosion-resistant and heat-resistant and have a gas sealing capability. One typical material which exhibits such properties is ceramics.

However, the ceramics used as the material of the coolant passages and the porous carbon or metal used as the material as the separators have different coefficients of thermal expansion. Consequently, the flow passages and the generator cells that are held in intimate contact with each other at the room temperature become spaced from each other when their temperature is increased to operate the fuel cell. When the flow passages and the generator cells are spaced from each other, since the heat from the generator cells is not transferred to the coolant, the cooling efficiency of the fuel cell stack is greatly reduced. With the through cooling arrangement, therefore, the temperature of the fuel cell stack cannot efficiently be controlled.

SUMMARY OF THE INVENTION

It is therefore an object of the present invention to provide a fuel cell which is capable of efficiently controlling the temperature of a fuel cell stack even though a temperature regulating medium is passed in the direction in which generator cells are stacked.

To achieve the above object, there is provided in accordance with the present invention a fuel cell comprising a fuel cell stack including a plurality of generator cells stacked and electrically connected in series, each of the generator cells comprising an electrolyte electrode assembly having an anode electrode for being supplied with a fuel gas, a cathode electrode for being supplied with an oxidizing agent gas, and an electrolyte interposed between the anode electrode and the cathode electrode, and a pair of separators having a fuel gas supply path for supplying the fuel gas and an oxidizing agent gas supply path for supplying the oxidizing agent gas, and sandwiching the electrolyte electrode assembly, the fuel cell stack having a through hole defined therein in a direction in which the generator cells are stacked, and a tube inserted through the through hole, the tube having a passage for passage of a temperature regulating medium therethrough, the fuel cell stack including at least one of an insulating elastic body and an insulating lubricant interposed between the tube and an inner wall of the through hole.

If the temperature of the fuel cell exceeds the operating temperature thereof while the fuel cell is in operation, then a cooling medium is introduced into the passage in the tube to cool the fuel cell. At this time, the gap between the generator cells and the tube is increased. However, the insulating elastic body is expanded by way of elastic deformation, or the insulating lubricant is extended, closing the increased gap. Thus, any spaces are prevented from being created between the generator cells and the tube. The heat of the fuel cell stack is quickly transferred to the tube through the insulating elastic body or the insulating lubricant for thereby efficiently cooling the fuel cell stack. For increasing the temperature of the fuel cell stack, a heating medium may be passed through the passage in the tube.

Since any spaces are prevented from being created between the generator cells and the tube, the temperature of the fuel cell stack and hence the fuel cell can be controlled efficiently.

The insulating elastic body or the insulating lubricant should preferably have a thermal conductivity of at least 0.5 W/m·K for efficiently transferring the heat.

The tube should preferably be made of metal. Since metal generally has a high thermal conductivity, the heat is transferred highly efficiently through the tube. Because at least one of the insulating elastic body and the insulating lubricant is present on the surface of the tube, the anode and cathode electrodes of each of the generator cells are prevented from being short-circuited to each other even though the tube is made of metal.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
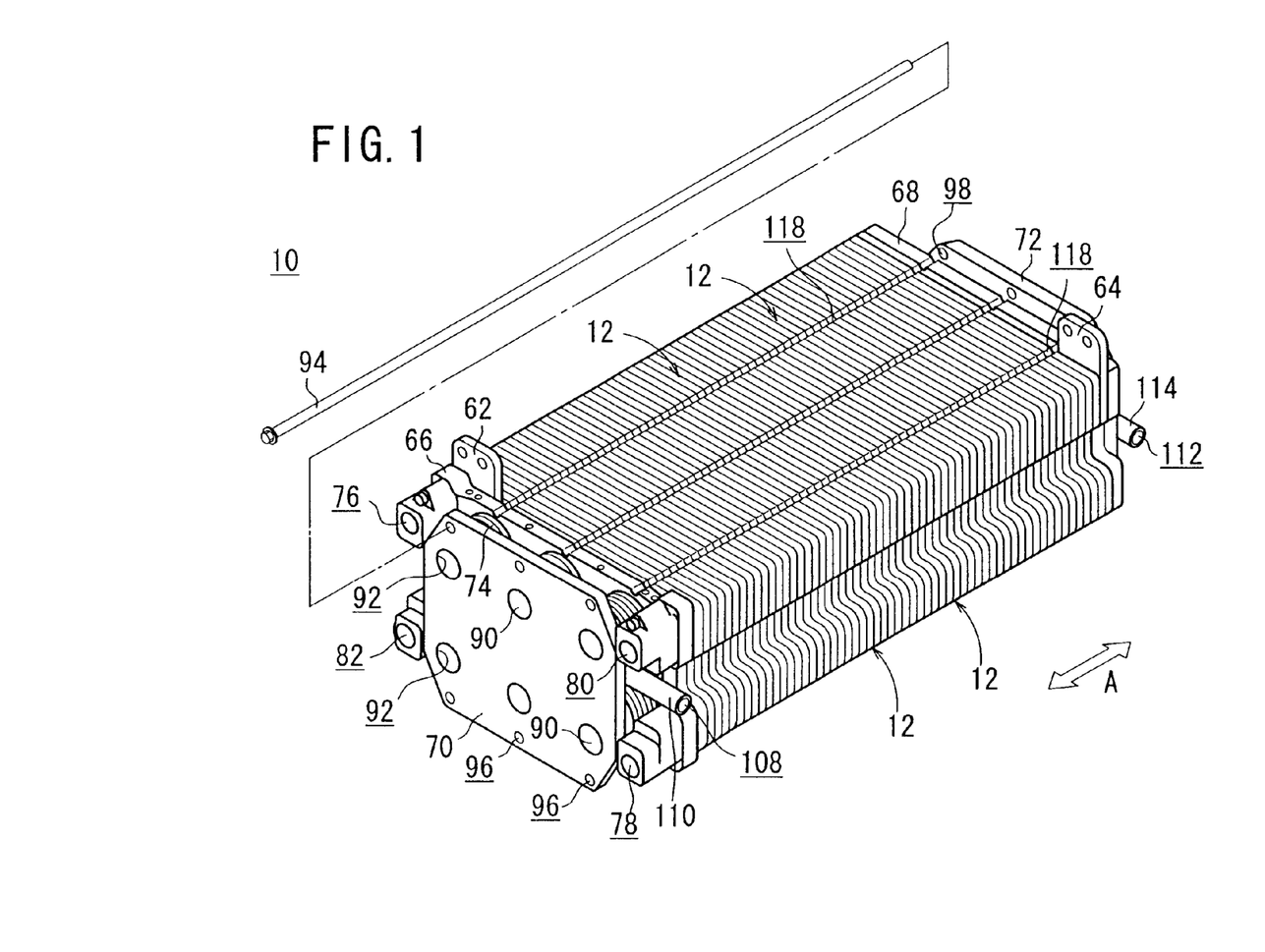
FIG. 1 is a perspective view of a fuel cell stack of a fuel cell according to an embodiment of the present invention.

A fuel cell stack 10 of a fuel cell according to an embodiment of the present invention is shown in perspective in FIG. 1. The fuel cell stack 10 is shown in enlarged fragmentary cross section in FIG. 2 and shown in exploded perspective in FIG. 3.

Figure 2:
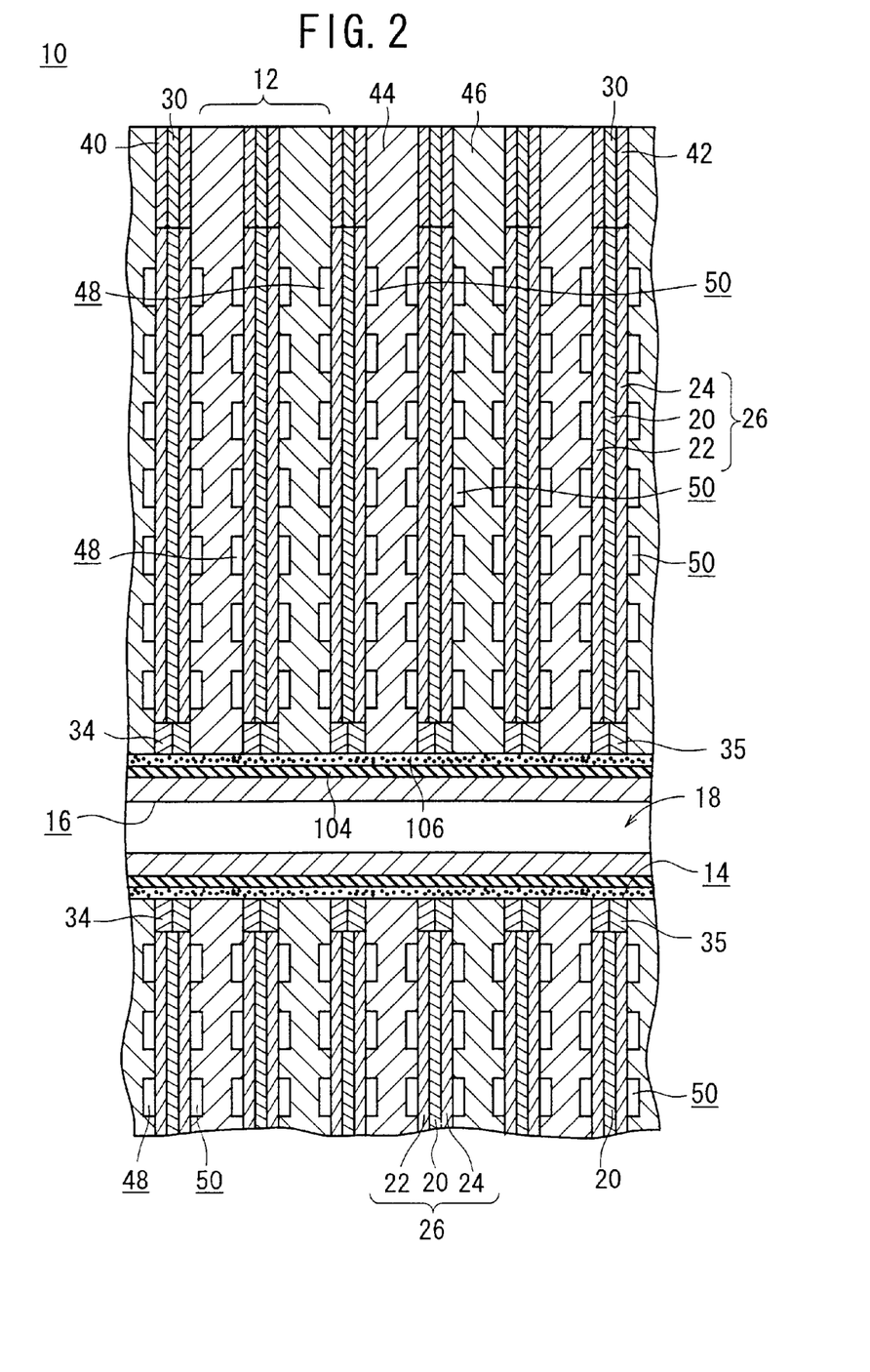
FIG. 2 is an enlarged fragmentary cross-sectional view of the fuel cell stack shown in FIG. 1.

The fuel cell stack 10 comprises a predetermined number of generator cells 12 which are electrically connected in series and stacked in the direction indicated by the arrow A. As shown in FIG. 2, the fuel cell stack 10 has a through hole 14 defined therein through which there extends a tube 18 having a passage 16 extending in the direction indicated by the arrow A, i.e., the direction in which the generator cells 12 are stacked.

Each of the generator cells 12 has an electrolyte electrode assembly 26 comprising an electrolyte layer 20 (see FIG. 2) interposed between an anode electrode 22 and a cathode electrode 24. The electrolyte layer 20 comprises, for example, a matrix made of a basic polymer such as polybenzimidazole or a porous silicon carbide and impregnated with a concentrated phosphoric acid. Alternatively, the electrolyte layer 20 may comprise a matrix made of polytetrafluoroethylene sulfonic acid impregnated with water.

Each of the anode and cathode electrodes 22, 24 has a gas diffusion layer (not shown) made of a carbon cloth or the like and an electrode catalyst layer (not shown) made of porous carbon particles carrying platinum on their surfaces and uniformly disposed on the surface of the gas diffusion layer. The anode and cathode electrodes 22, 24 are joined to the electrolyte layer 20 such that their electrode catalyst layers confront each other through the electrolyte layer 20.

The electrolyte electrode assembly 26 is supported on a frame-shaped sealing member 30 (see FIGS. 2 and 3) having an opening which is of substantially the same dimensions as the outer dimensions of the electrolyte electrode assembly 26. Specifically, the electrolyte electrode assembly 26 is placed and held in the opening in the frame-shaped sealing member 30. The electrolyte electrode assembly 26 has a through hole 32 defined substantially centrally therein, the through hole 32 being part of the through hole 14 in the fuel cell stack 10. Small gaskets 34, 35 made of a synthetic resin having a relatively large thermal conductivity, such as polytetrafluoroethylene, and fitted in the inner wall of the through hole 32.

Each of the generator cells 12 also has large gaskets 40, 42 having respective openings 36, 38 which are of substantially the same dimensions as the outer dimensions of the cathode electrode 24 or the anode electrode 22 and of substantially the same thickness as the thickness of the anode and cathode electrodes 22, 24, and a pair of separators 44, 46 made of porous carbon or metal. Each of the generator cells 12 comprises the electrolyte electrode assembly 26 and the large gaskets 40, 42 that are sandwiched between the separators 44, 46. The cathode electrode 24 and the anode electrode 22 are placed respectively in the openings 36, 38 of the large gaskets 40, 42.

First gas passages 48 for supplying a hydrogen-containing gas to and discharging a hydrogen-containing gas from the anode electrode 22 are defined in the surfaces of the separators 44, 46 which face the anode electrode 22. Second gas passages 50 for supplying an oxygen-containing gas to and discharging an oxygen-containing gas from the cathode electrode 24 are defined in the surfaces of the separators 44, 46 which face the cathode electrode 24 (see FIG. 2). The first and second gas passages 48, 50 serve as introduction passages for introducing a hydrogen-containing gas and an oxygen-containing gas, and also as discharge passages for discharging a hydrogen-containing gas and an oxygen-containing gas which are not reacted.

The separators 44, 46 have respective through holes 52 defined therein which are part of the through hole 14 in the fuel cell stack 10.

Figure 3:
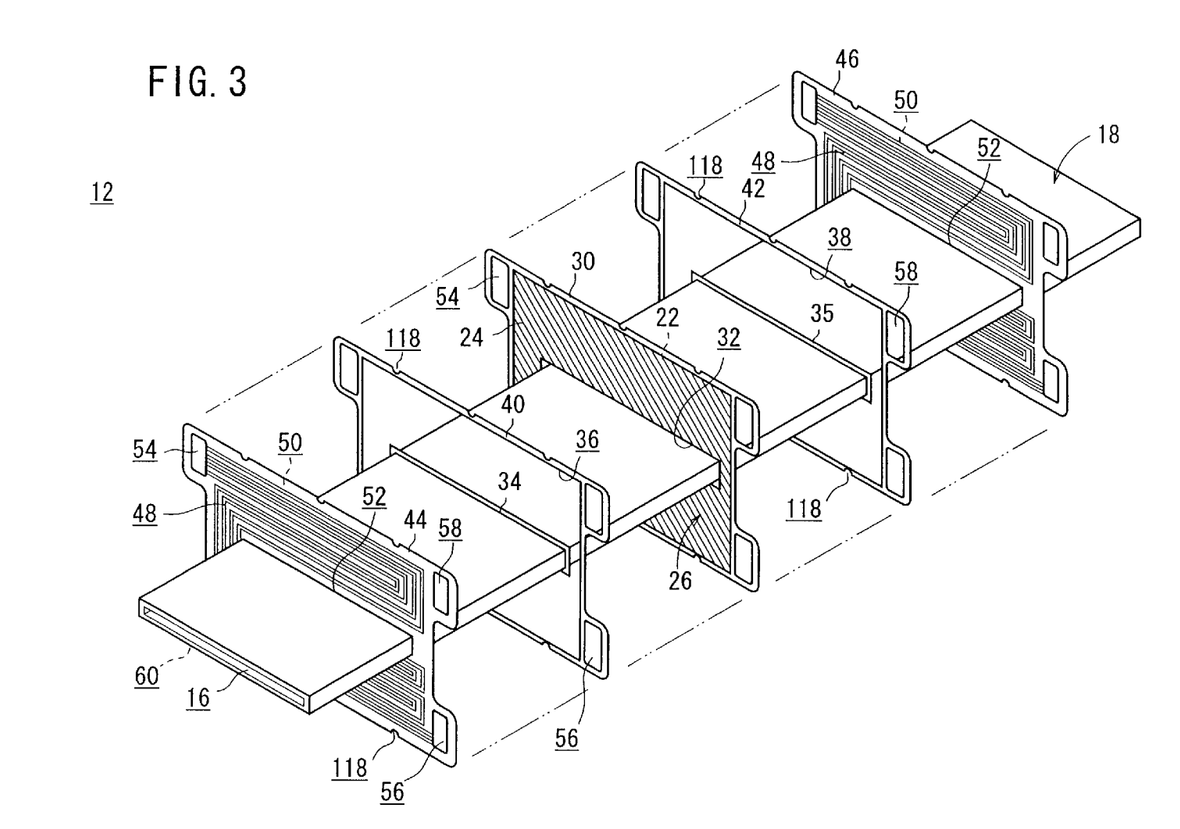
FIG. 3 is an exploded perspective view of a generator cell of the fuel cell stack shown in FIG. 1.

As shown in FIG. 3, the generator cell 12 has a first gas inlet passage 54 defined in an upper left corner thereof for passing the hydrogen-containing gas and a first gas outlet passage 56 defined in a diagonally opposite corner for passing the unreacted hydrogen-containing gas. The generator cell 12 also has a second gas inlet passage 58 defined in an upper right corner thereof for passing the oxygen-containing gas and a second gas outlet passage 60 defined in a diagonally opposite corner for passing the unreacted oxygen-containing gas. The first gas inlet passage 54 and the first gas outlet passage 56 communicate with the first gas passages 48, and the second gas inlet passage 58 and the second gas outlet passage 60 communicate with the second gas passages 50.

Figure 4:
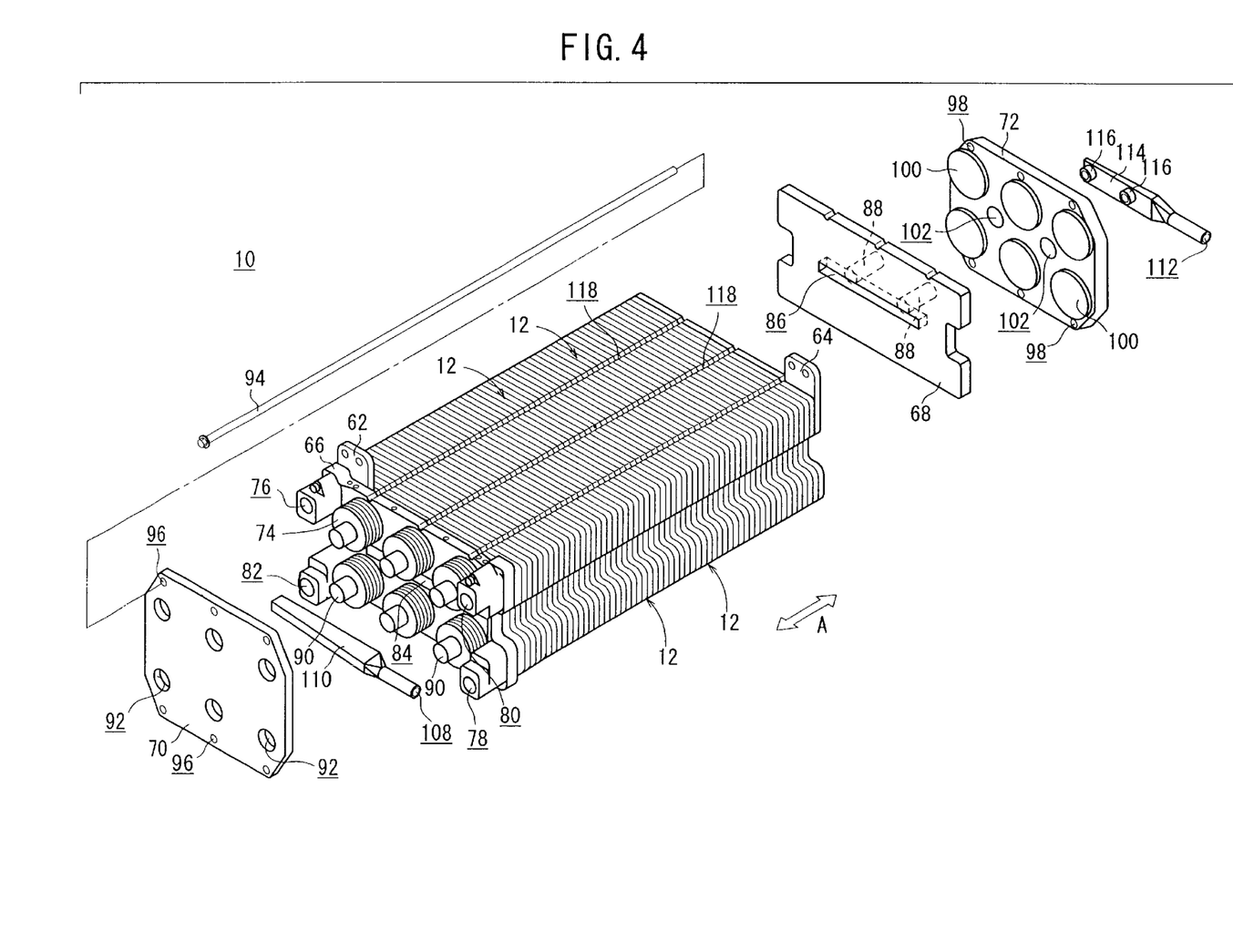
FIG. 4 is an exploded perspective view of the fuel cell stack shown in FIG. 1.

Of the generator cells 12 thus constructed, the generator cells 12 positioned at the opposite ends of the fuel cell stack 10 are electrically connected to current-collecting electrodes 62, 64 shown in FIGS. 1 and 4. End plates 66, 68 are disposed on insulating sheets (not shown), which prevent leakage currents from occurring, disposed on respective outer surfaces of the current-collecting electrodes 62, 64. Backup plates 70, 72 are disposed on respective outer surfaces of the end plates 66, 68. The insulating sheets and the current-collecting electrodes 62, 64 also have through holes (not shown) which are part of the through hole 14 in the fuel cell stack 10. A plurality of disc springs 74 are interposed between the end plate 66 and the backup plate 70.

The end plate 66 has a first gas introduction port 76, a first gas discharge port 78, a second gas introduction port 80, and a second gas discharge port 82 defined therein. The first gas introduction port 76 and the first gas discharge port 78 communicate respectively with the first gas inlet passage 54 and the first gas outlet passage 56. The second gas introduction port 80 and the second gas discharge port 82 communicate respectively with the second gas inlet passage 58 and the second gas outlet passage 60. The end plate 66 further has a through hole 84 defined substantially centrally therein which is part of the through hole 14 in the fuel cell stack 10.

The other end plate 68 has a medium reservoir chamber 86 defined in an end face thereof in alignment with the through hole 14, and also has tubular members 88 projecting from an opposite end face thereof and having medium passages defined therein which communicate with the medium reservoir chamber 86.

The backup plate 70 has a plurality of large through holes 92 defined therein for passage therethrough of respective support shafts 90 which supports the disc springs 74, and a plurality of small through holes 96 defined therein for passage therethrough of respective tie rods 94. The backup plate 72 has a plurality of small through holes 98 defined therein in alignment with the respective small through holes 96. A plurality of disc members 100 are fixed to the end face of the backup plate 72 which faces the end plate 68. The backup plate 72 also has a pair of large through holes 102 defined therein in alignment with the tubular members 88 on the end plate 68, which pass through the large through holes 102, respectively.

The tube 18 inserted in the through hole 14 has a rectangular cross section and is made of a metal which is not limited to any metal, but should preferably have a large heat conductivity for quickly transferring heat between a temperature regulating medium flowing through the passage 16 and the generator cells 12, i.e., for efficiently controlling the temperature of the generator cells 12, i.e., the fuel cell stack 10.

In view of the above temperature control requirement, the metal of the tube 18 may be a copper alloy such as Cu-0.5%Te, Cu-10%Zn, Cu-30%Zn, Cu-40%Zn, Cu-5%Sn-0.2%P, Cu-37% Zn-1%Sn, Cu-22%Zn-2%Al, or the like, an aluminum alloy such as Al-0.12%Cu, Al-4.5%Cu-1.5%Mg-0.6%Mn, Al-1.2%Mn-0.12%Cu, Al-3.5%Mg-0.25%Cr, Al-1%Mg-0.6%Si-0.3%Cu-0.2%Cr, Al-5.6%Zn-2.5%Mg-1.6%Cu-0.3%Cr, Al-7%Si-0.3%Mg, Al-17%Si-4.5%Cu0.6%Mg, Al-12%Si, Al-8.5%Si-3.5%Cu, Al-11%Si-2.5%Cu, or the like, or a magnesium alloy such as Mg-3%al-0.2%Mn-1%Zn, Mg-5.8%Zn-2.6%RE-0.7%Zr, Mg-2.5%Ag-1%Th-1%RE, or the like. The above numerical values represent weight %, and RE represents rare earth.

Figure 5:
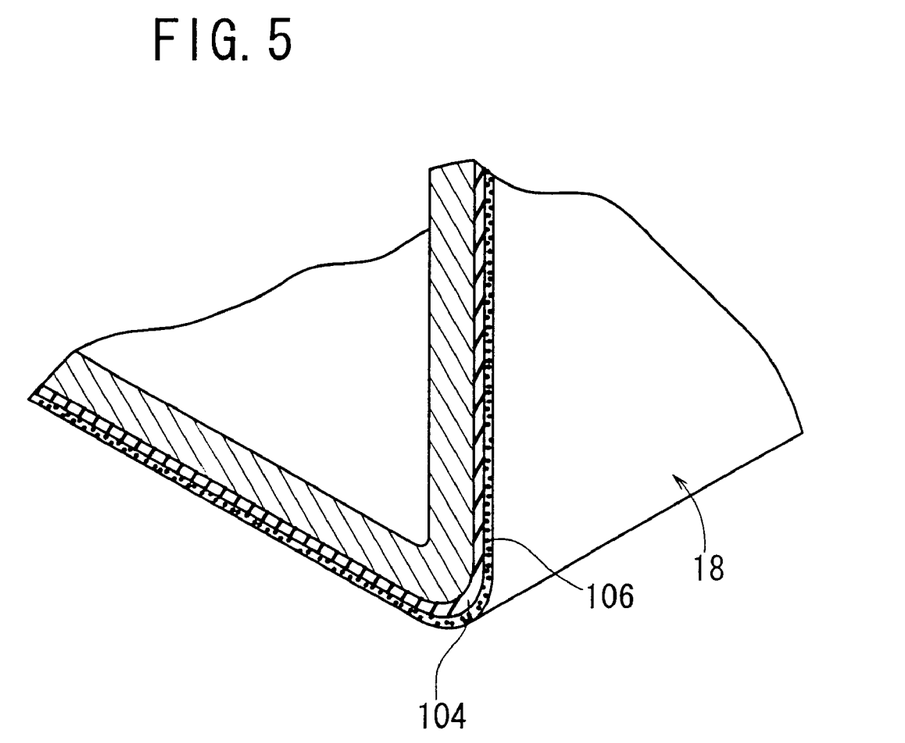
FIG. 5 is a fragmentary perspective view, partly in cross section, of a tube having an outer surface covered with an insulating layer which is coated with a lubricant.

As shown in FIGS. 2 and 5, the tube 18 has an outer surface covered with an insulating layer 104 having an outer surface coated with a lubricant 106.

The insulating layer 104 serves to prevent the anode electrode 22 or the cathode electrode 24 from being short-circuited to the tube 18, and is made of elastic material. Even when the operating temperature of the fuel cell varies, the insulating layer 104 is elastically deformed itself to keep the generator cells 12 and the tube 18 in close contact with each other.

The elastic material of the insulating layer 104 is not limited to any particular materials, but should preferably have a thermal conductivity of 0.5 W/m·K or higher. If the elastic material of the insulating layer 104 had a thermal conductivity lower than 0.5 W/m·K, then it would fail to efficiently control the temperature of the generator cells 12, i.e., the fuel cell stack 10.

An elastic material with a high thermal conductivity may be silicone rubber, for example. Some commercially available silicone rubbers have a thermal conductivity up to 5.0 W/m·K which is much greater than the thermal conductivity ranging from 0.1 to 0.2 W/m·K of general rubbers and synthetic resins.

The lubricant 106 serves to allow the separators 44, 46 and the electrolyte electrode assembly 26 to move smoothly back and forth on the tube 18. The lubricant 106 thus allows the tube 18 to be easily inserted into the through hole 14 in the fuel cell stack 10. When the lubricant 106 is applied to the inner wall of the through hole 14 in the fuel cell stack 10 and the insulating layer 104, it is effective to keep the generator cells 12 and the tube 18 in closer contact with the each other.

The lubricant 106 is also made of insulating material to prevent the anode electrode 22 or the cathode electrode 24 from being short-circuited to the tube 18.

For efficiently controlling the temperature of the fuel cell stack 10, the lubricant 106 should also preferably have a thermal conductivity of 0.5 W/m·K or higher. The lubricant 106 with such a thermal conductivity may be an oil chiefly comprising silicone oil and containing a metal oxide, which is commercially available as a heat-radiating oil compound. Some heat-radiating oil compounds have a thermal conductivity up to 4.5 W/m·K.

As shown in FIG. 4, the inlet of the passage 16, which is one of the openings of the tube 18, communicates with the through hole 84 in the end plate 66, and the outlet of the passage 16, which is the other opening of the tube 18, communicates via the medium reservoir chamber 86 with the medium passages in the tubular members 88. To the end plate 66, there is connected a tube joint 110 having an introduction port 108 for introducing the temperature regulating medium into the passage 16.

To the backup plate 72, there is connected a tube joint 114 having a discharge port 112 for discharging the temperature regulating medium from the passage 16. The tube joint 114 has a joint body from which tubular members 116 project. The tubular members 116 are fitted in the respective medium passages in the tubular members 88 on the end plate 68 which extend through the large through holes 102 in the backup plate 72.

The backup plates 70, 72 are connected and tightened to each other by tie rods 94 that are inserted through the small through holes 96, 98 in the backup plates 70, 72, thus tightening in place the generator cells 12 and the current-collecting electrodes 62, 64 in the direction indicated by the arrow A thereby to provide the fuel cell stack 10 (see FIG. 1). At this time, the disc springs 74 are compressed, and the end plate 68 and the backup plate 72 are brought into intimate contact with each other with the disc members 100 interposed therebetween. The tie rods 94 are positioned in respective notches 118 that are defined in upper and lower edges of the generator cells 12 and the current-collecting electrodes 62, 64.

After the fuel cell stack 10 thus assembled is placed in a container (not shown), a fuel gas supply and an oxidizing agent supply are connected to the first and second gas introduction ports 76, 80, respectively, and a gas retrieval mechanism is connected to the first and second gas discharge ports 78, 82, thereby making up the fuel cell.

The fuel cell according to the embodiment of the present invention is basically constructed as described above. Now, operation and advantages of the fuel cell will be described below.

The fuel cell stack 10 of the fuel cell is manufactured as follows:

The tube 18 whose surface is covered with the insulating layer 104 such as of silicone rubber or the like which is coated with the lubricant 106 such as of silicon oil or the like is passed through the through hole 84 in the end plate 66, and then passed successively through the through holes in the insulating sheets and the current-collecting electrode 62 in the order named. Then, the tube 18 is passed through the through holes and openings in the separator 44, the large gasket 40, the small gasket 34, the electrolyte electrode assembly 26 supported on the frame-shaped sealing member 30, the small gasket 35, the large gasket 42, and the separator 46 in the order named (see FIG. 3), which are then pressed together.

Since the tube 18 is coated with the lubricant 106 (see FIGS. 2 and 5), the above components can smoothly moved back and forth on the tube 18, or stated otherwise, the tube 18 can easily be inserted into the through holes and openings in the above components. At this time, the lubricant 106 is applied to the inner walls of the through holes and openings in the above components.

After the components are pressed together, the small gaskets 34, 35 are fitted in the through hole 32 in the electrolyte electrode assembly 26. Therefore, the insulating layer 104, the lubricant 106, and the small gaskets 34, 35 are interposed between the tube 18 and the electrolyte electrode assembly 26 (see FIG. 2). The insulating layer 104 thus interposed is compressed by the tube 18, the electrolyte electrode assembly 26, and the separators 44, 46 (the generator cells 12).

Then, after the tube 18 has been passed through at least one set of the separator 44, the large gasket 40, the small gasket 34, the electrolyte electrode assembly 26 supported on the frame-shaped sealing member 30, the small gasket 35, the large gasket 42, and the separator 46, the tube 18 is passed through the through holes in the current-collecting electrode 64 and the insulating sheet. The end of the tube 18 which has projected from the insulating sheet is fitted in the medium reservoir chamber 86 in the end plate 68 (see FIG. 4).

The tube joint 110 is connected to the through hole 84 in the end plate 66, and the disc springs 74 are placed in position, after which the support shafts 90 are passed through the large through holes 92 in the backup plate 70.

The tubular members 88 on the end plate 68 are passed through the large through holes 102 in the backup plate 72, after which the tubular members 116 on the tube joint 114 are fitted in the respective tubular members 88.

The opposite ends of the tie rods 94 are then passed through the small through holes 96, 98 in the backup plates 70, 72, thus tightening the backup plates 70, 72. The generator cells 12 and the current-collecting electrodes 62, 64 are now tightened in the direction indicated by the arrow A, making up the fuel cell stack 10 (see FIG. 1).

After the fuel cell stack 10 is placed in a container, a fuel gas supply and an oxidizing agent supply are connected to the first and second gas introduction ports 76, 80, respectively, and a gas retrieval mechanism is connected to the first and second gas discharge ports 78, 82, thereby making up the fuel cell. A heater or the like for heating the fuel cell stack 10 is also placed in the container.

A load (not shown) such as a motor is electrically connected to the current-collecting electrodes 62, 64 which project from the container. The tube joints 110, 114 are connected to a medium circulating and supplying mechanism for circulating and supplying the temperature regulating medium.

The fuel cell thus constructed operates as follows:

For operating the fuel cell, the heater is energized to increase the temperature of the fuel cell stack 10. At this time, a heating medium is passed through the passage 16 in the tube 18. The heating medium is higher in temperature than the fuel cell stack 10, and the heat of the heating medium is first transferred to the tube 18.

As described above, the tube 18 is made of metal. Since metal generally has a high thermal conductivity, the heat of the heating medium is transferred highly efficiently through the tube 18 to the insulating layer 104 and the lubricant 106.

The insulating layer 104 and the lubricant 106 have respective thermal conductivities of 0.5 W/m·K or higher and the small gaskets 34, 35 are made of polytetrafluoroethylene having a relatively high thermal conductivity. Consequently, the heat is efficiently transferred through the insulating layer 104, the lubricant 106, and the small gaskets 34, 35 to the electrolyte electrode assembly 26. The heat is also quickly transferred through the insulating layer 104 and the lubricant 106 to the separators 44, 46, thus increasing the temperature of the fuel cell stack 10.

By thus passing the heating medium through the passage 16 in the tube 18, the temperature of the fuel cell stack 10 and hence the entire fuel cell can quickly be increased to a given operating temperature.

After the temperature of the fuel cell has increased to the given operating temperature, the fuel cell is supplied with a hydrogen-containing gas and an oxygen-containing gas respectively from the fuel gas supply and the oxidizing agent supply. The hydrogen-containing gas flows through the first gas introduction port 76, the first gas inlet passage 54, and the first gas passage 48 to the electrode catalyst layer of the anode electrode 22. On the electrode catalyst layer, the hydrogen in the hydrogen-containing gas is ionized according to the above formula (A). Components other than the hydrogen in the hydrogen-containing gas and unreacted hydrogen are delivered via the first gas outlet passage 56 and the first gas discharge port 78 to the gas retrieval mechanism.

Hydrogen ions produced when the hydrogen is ionized are conducted through the electrolyte layer 20 to the electrode catalyst layer of the cathode electrode 24. Electrons which are also produced when the hydrogen is ionized are extracted from the fuel cell via the current-collecting electrode 62, are used as electric energy to energize the load, and then flow through the current-collecting electrode 64 to the electrode catalyst layer of the cathode electrode 24.

The oxygen-containing gas are passed through the second gas introduction port 80, the second gas inlet passage 58, and the second gas passage 50 to the electrode catalyst layer of the cathode electrode 24. Oxygen contained in the oxygen-containing gas is bonded to the hydrogen ions and electrons that have reached the electrode catalyst layer of the cathode electrode 24 according to the formula (B). Components other than the oxygen contained in the oxygen-containing gas, unreacted oxygen, and a generated water vapor are delivered via the second gas passage 50, the second gas outlet passage 60, and the second gas discharge port 82 to the gas retrieval mechanism.

The through hole 32 in the electrolyte electrode assembly 26 is sealed by the small gaskets 34, 35, and the anode electrode 22 and the cathode electrode 24 are sealed by the large gaskets 40, 42. The liquid impregnated in the electrolyte layer 20 is prevented from leaking by the frame-shaped sealing member 30.

If the temperature of the fuel cell exceeds the operating temperature while the fuel cell is in operation, then a cooling medium (hereinafter referred to as "coolant") is introduced through the tube joint 110. When the coolant is passed through the passage 16 in the tube 18, it cools the fuel cell stack 10.

At this time, the gap between the generator cells 12 and the tube 18 is increased because the generator cells 12 are thermally expanded and the tube 18 is low in temperature as the coolant is flowing through the passage 16 in the tube 18. At this time, the insulating layer 104 interposed between the generator cells 12 and the tube 18 is expanded by way of elastic deformation, closing the increased gap. When the gap is increased, the lubricant 106 applied to the insulating layer 104 and the small gaskets 34, 35 or the inner walls of the through holes 52 in the separators 44, 46 is extended. Even if the gap is increased more than the insulating layer 104 is expanded, the space between the insulating layer 104 and each of the inner walls is closed by the extended lubricant 106.

Therefore, any undesired gaps or clearances are prevented from being created in the space from the tube 18 to each of the inner walls, so that the heat can be transferred highly efficiently from the generator cells 12 to the tube 18 because of the high thermal conductivities of the lubricant 106, the insulating layer 104, and the tube 18. The heat transferred to the tube 18 is finally transferred to the coolant by way of heat exchange, and thereafter quickly discharged out of the fuel cell as the coolant is discharged from the tube joint 114.

In the present embodiment, the metal tube 18 is employed and its surface is covered with the insulating layer 104 having a high thermal conductivity which is coated with the lubricant 106. Consequently, the temperature of the fuel cell stack 10 and hence the fuel cell can efficiently be controlled because the heat is efficiently transferred between the tube 18, the insulating layer 104, and the lubricant 106. Further, the insulating layer 104 and the lubricant 106 are effective to prevent spaces from being created between the tube 18 and the generator cells 12.

Since the surface of the tube 18 is covered with the insulating layer 104, the anode electrode 22 and the cathode electrode 24 are prevented from being short-circuited to each other.

In the above embodiment, the tube 18 is made of metal. However, the tube 18 may be made of ceramics. With the tube 18 made of ceramics, since the insulating layer 104 and the lubricant 106 are also effective to prevent spaces from being created between the tube 18 and the generator cells 12, the temperature of the fuel cell can also be effectively controlled.

In the above embodiment, both the insulating layer 104 and the lubricant 106 are used in combination. However, one of the insulating layer 104 and the lubricant 106 may be used alone. If either of the insulating layer 104 or the lubricant 106 is used alone, the thickness of the insulating layer 104 or the coated amount of the lubricant 106 may be selected not to create any space between the generator cells 12 and the tube 18.

With the fuel cell according to the present invention, as described above, because at least one of the insulating elastic body or the insulating lubricant is interposed between the inner wall of the through hole defined in the fuel cell stack in the direction in which the generator cells are stacked and the tube inserted in the through hole, any spaces are prevented from being created between the tube and the fuel cell stack. Therefore, the heat is quickly transferred from the temperature regulating medium flowing through the passage in the tube to the fuel cell stack, or vice versa, making it possible to efficiently control the temperature of the fuel cell stack and hence the fuel cell.

The above advantages manifest themselves particularly if the insulating elastic body or the insulating lubricant has a thermal conductivity of 0.5 W/m·K or higher or if the tube is made of metal.

Although a certain preferred embodiment of the present invention has been shown and described in detail, it should be understood that various changes and modifications may be made therein without departing from the scope of the appended claims.

What is claimed is:

1. A fuel cell comprising: a fuel cell stack including a plurality of generator cells stacked and electrically connected in series, each of said generator cells comprising an electrolyte electrode assembly having an anode electrode for being supplied with a fuel gas, a cathode electrode for being supplied with an oxidizing agent gas, and an electrolyte interposed between said anode electrode and said cathode electrode, and a pair of separators having a fuel gas supply path for supplying said fuel gas and an oxidizing agent gas supply path for supplying said oxidizing agent gas, and sandwiching said electrolyte electrode assembly; said fuel cell stack having a through hole defined therein in a direction in which said generator cells are stacked, and a tube inserted through said through hole, said tube having a passage for passage of a temperature regulating medium therethrough; said fuel cell stack including at least one of an elastic insulator and an insulating lubricant interposed between said tube and an inner wall of said through hole.

2. A fuel cell according to claim 1, wherein said elastic insulator or said insulating lubricant has a thermal conductivity of at least 0.5 W/m·K.

3. A fuel cell according to claim 1, wherein said tube is made of metal.

4. A fuel cell according to claim 1, wherein said elastic insulator has a thermal conductivity ranging from about 0.5 to 5.0 W/m·K.

5. A fuel cell according to claim 4, wherein said elastic insulator is made of silicone rubber.

6. A fuel cell according to claim 1, wherein said insulating lubricant is made of a heat-radiating oil compound.

7. A fuel cell according to claim 6, wherein said heat-radiating oil compound has a thermal conductivity ranging from about 0.5 to 4.5 W/m·K.

8. A fuel cell according to claim 7, wherein said heat-radiating oil compound comprises silicone oil containing a metal oxide.

9. A fuel cell according to claim 3, wherein the metal of said tube comprises Cu-0.5%Te, Cu-10%Zn, Cu-30%Zn, Cu40%Zn, Cu-5%Sn-0.2%P, Cu-37%Zn-1%Sn, Cu-22%Zn-2%Al, Al0.12%Cu, Al-4.5%Cu-1.5%Mg-0.6%Mn, Al-1.2%Mn-0.12%Cu, Al-3.5%Mg-0.25%Cr, Al-1%Mg-0.6%Si-0.3%Cu-0.2%Cr, Al-5.6%Zn-2.5%Mg1.6%Cu-0.3%Cr, Al-7%Si-0.3%Mg, Al-17%Si-4.5%Cu-0.6%Mg, Al12%Si, Al-8.5%Si-3.5%Cu, Al-11%Si-2.5%Cu, Mg-3%al-0.2%Mn1%Zn, Mg-5.8%Zn-2.6%RE-0.7%Zr, or Mg-2.5%Ag-1% Th-1%RE where the numerical values represent weight %, and RE represents rare earth.

10. A fuel cell according to claim 1, wherein the elastic insulator comprises an insulating layer covering an outer surface of the tube.

* * * * *